(12) United States Patent
Thomas

(10) Patent No.: US 6,234,362 B1
(45) Date of Patent: May 22, 2001

(54) DISPENSING APPARATUS

(75) Inventor: Jonathan Thomas, King's Lynn (GB)

(73) Assignee: Bespak PLC, King's Lynn (GB)

( * ) Notice: Subject to any disclaimer, the term of this patent is extended or adjusted under 35 U.S.C. 154(b) by 0 days.

(21) Appl. No.: 09/620,910

(22) Filed: Jul. 20, 2000

Related U.S. Application Data

(62) Division of application No. 08/952,751, filed as application No. PCT/GB96/01551 on Jun. 27, 1996, now Pat. No. 6,092,696.

(30) Foreign Application Priority Data

Jun. 27, 1996 (GB) .................................................. 9513084

(51) Int. Cl.⁷ .................................................. B65D 83/00
(52) U.S. Cl. .......................................................... 222/402.1
(58) Field of Search ........................ 222/402.1; 277/650, 277/935, 936, 943, 944, 945

(56) References Cited

U.S. PATENT DOCUMENTS

| | | |
|---|---|---|
| 3,919,448 | 11/1975 | Dufresne . |
| 4,275,319 | 6/1981 | Davis, Jr. . |
| 4,575,522 | 3/1996 | Breach et al. . |
| 5,290,539 | 3/1994 | Marecki . |
| 5,836,299 | 11/1998 | Kwon . |
| 6,092,696 | * 7/2000 | Thomas .............................. 222/402.1 |

FOREIGN PATENT DOCUMENTS

| | | |
|---|---|---|
| 549568 | 1/1985 | (FR) . |
| 2705951 | 12/1994 | (FR) . |
| 2148912 | 6/1985 | (GB) . |
| WO 93/22221 | 11/1993 | (WO) . |
| WO 94/25373 | 11/1994 | (WO) . |
| WO 95/02651 | 1/1995 | (WO) . |
| WO 95/03984 | 2/1995 | (WO) . |

* cited by examiner

Primary Examiner—Philippe Derakshani
(74) Attorney, Agent, or Firm—Smith, Gambrell & Russell

(57) ABSTRACT

Dispensing apparatus for dispensing pressurised fluid comprising a valve body defining a chamber and a valve member extending movably through the chamber and through at least one annular seal co-operating with the valve member and the body to regulate the discharge of fluid. The seal is formed from a material comprising A a copolymer of ethylene and propylene or B a terpolymer of ethylene, propylene and a diene, or C a material selected from isobutylene isoprene, polychloroprene or fluorinated rubber. The seal may contain a mineral filler.

12 Claims, 2 Drawing Sheets

DISPENSING APPARATUS

Figure 1:
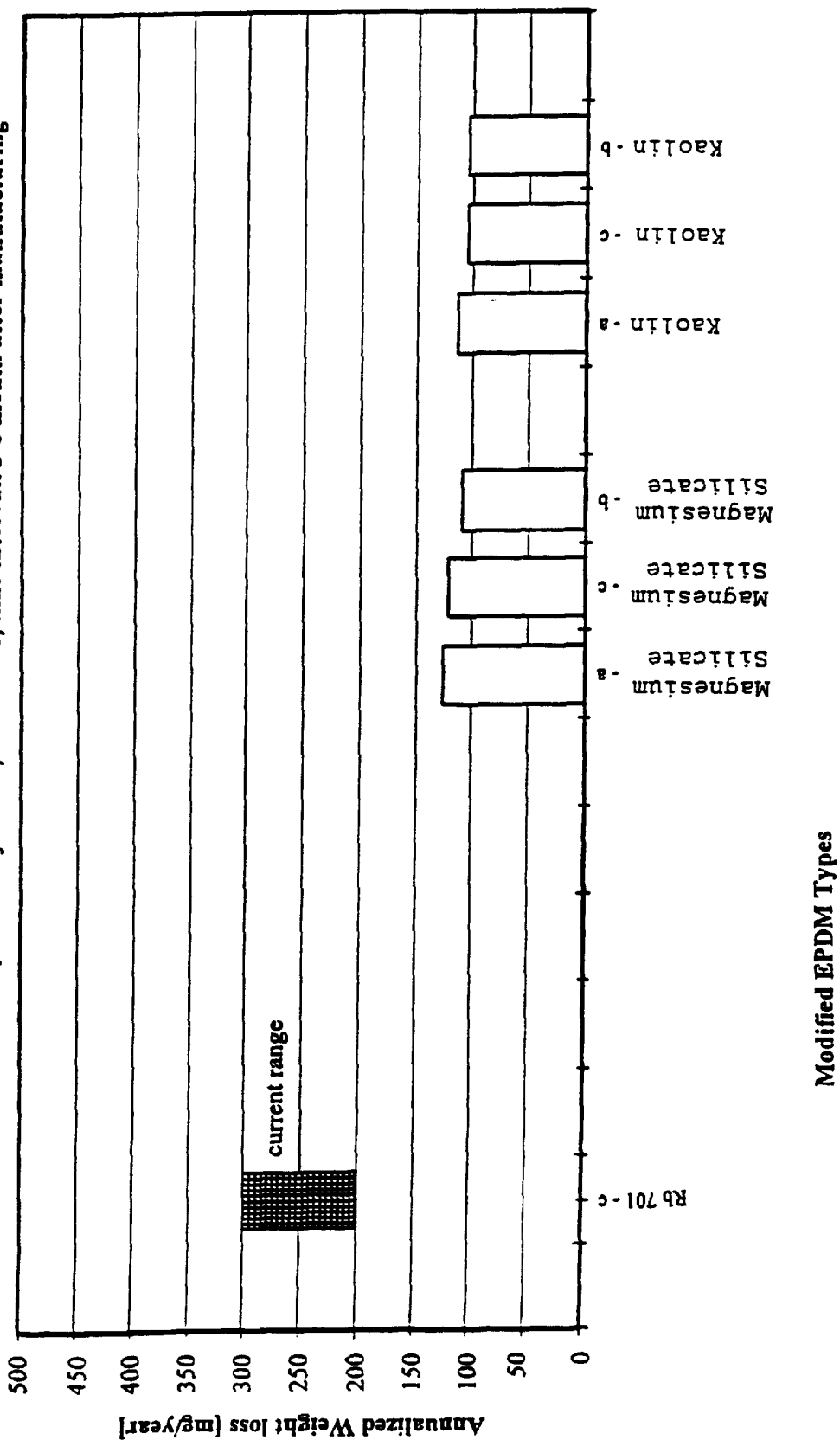

The present application is a divisional of U.S. Ser. No. 08/952,751, filed Dec. 4, 1997 now U.S. Pat. No. 6,092,696 which is a 371 of PCT/GB96/01551 filed Jun. 27, 1996, which prior application is incorporated herein by reference.

BACKGROUND OF THE INVENTION

This invention relates to a dispensing apparatus for dispensing pressurised fluid in the form of an aerosol and in particular but not exclusively for dispensing medicine or products in solution or suspension in an alcohol base.

It is known from GB-1201918 for example to provide dispensing apparatus in which pressurised fluid from a pressurised dispensing container is released by a valve in a controlled manner, the valve including elastomeric seals which are annular and which co-operate with a sliding valve stem to open and close fluid ports.

Products to be dispensed are commonly provided in solution or suspension in an alcohol base, this being particularly common in the dispensing of medicinal compounds for inhalation therapy.

Typical apparatus includes a CFC volatile propellant having a liquid phase in which the product together with the alcohol carrier is readily soluble within the container and a typical material for the valve seal is a synthetic rubber such as nitrile rubber.

Recent trends in the production of aerosol dispensers have moved away from CFC propellants because of their environmental hazards and HFC propellants are now being introduced. A problem with such propellants is that alcohol is less soluble in the liquid phase of such propellants and tends to separate within the container thereby exposing the valve seals to a much greater concentration of alcohol than was formerly the case. Seal materials such as nitrile rubber allow alcohol vapour to escape by permeation over extended storage periods so that the remaining quantity of alcohol is significantly depleted.

It is an object of the present invention to provide dispensing apparatus which will allow the use of HFC propellants with alcohol based products without the above disadvantage.

According to the present invention there is disclosed dispensing apparatus for dispensing pressurised fluid comprising a valve body defining a chamber, a valve member extending movably through the chamber and through at least one annular seal co-operating with the valve member and the body to regulate the discharge of fluid, wherein the or at least one of the seals is formed from a material comprising (a) a copolymer of ethylene and propylene or (b) a terpolymer of ethylene, propylene and a diene, or (c) a material selected from isobutylene isoprene, polychloroprene or a fluorinated rubber.

It has been found that the extent to which alcohol evaporates from such apparatus using such seal materials is significantly decreased so that typically a required shelf life of three years can be readily achieved.

Preferably the material comprises a peroxide curing agent.

A peroxide curing agent such as dicumyl peroxide is preferable to other curing agents such as sulphur since its use minimises the formation of extractives (e.g. 2-mercaptobenzothiazole, N-nitrosamines, mercaptobenzothiazole disulphide) resulting from contact between the material and alcohol in use.

Preferably the seal material comprises a mineral filler. Mineral fillers are preferable to carbon black in order to minimise the formation of polynuclear aromatic hydrocarbon compounds.

Advantageously the mineral filler is selected from the group comprising magnesium silicate, aluminium silicate, silica titanium oxide, zinc oxide, calcium carbonate, magnesium carbonate, magnesium aluminium silicate, aluminium hydroxide, talc, kaolin and clay. Preferably the filler is magnesium silicate or kaolin.

Preferably the apparatus comprises a pressurised dispensing container operatively connected to the valve body and containing the fluid to be dispensed and a hydrofluorocarbon propellant comprising propellant type 134a or 227.

(The designation of propellant types referred to in the present application is as specified in British Standard BS4580:1970"Specification for number designations of organic refrigerants". Accordingly, propellant 134a is: 1,1,1,2-Tetrafluoroethane $CH_2F$—$CF_3$ and propellant 227 is:
1,1,1,2,3,3,3 Heptafluoropropane $CF_3$—$CHF$—$CF_3$).

Typically the fluid to be dispensed comprises a liquid or particulate product as a solution or suspension in a carrier liquid comprising an alcohol such as ethanol.

A preferred embodiment of the present invention will now be described by way of example.

In a pressurised dispensing container of the type disclosed in GB-1201918, a valve body is provided with two annular valve seals through which a valve member is axially slidable, the seals being disposed at inlet and outlet apertures of a valve chamber so that the valve functions as a metering valve.

In accordance with the present invention the seals are formed from a material comprising a copolymer of ethylene and propylene (EPM) cured using dicumyl peroxide as curing agent and containing magnesium silicate as a filler.

Satisfactory results have been obtained using such seals where the fluid to be dispensed comprises up to 50% by weight of ethanol and the propellant is of type 134a.

Figure 2:
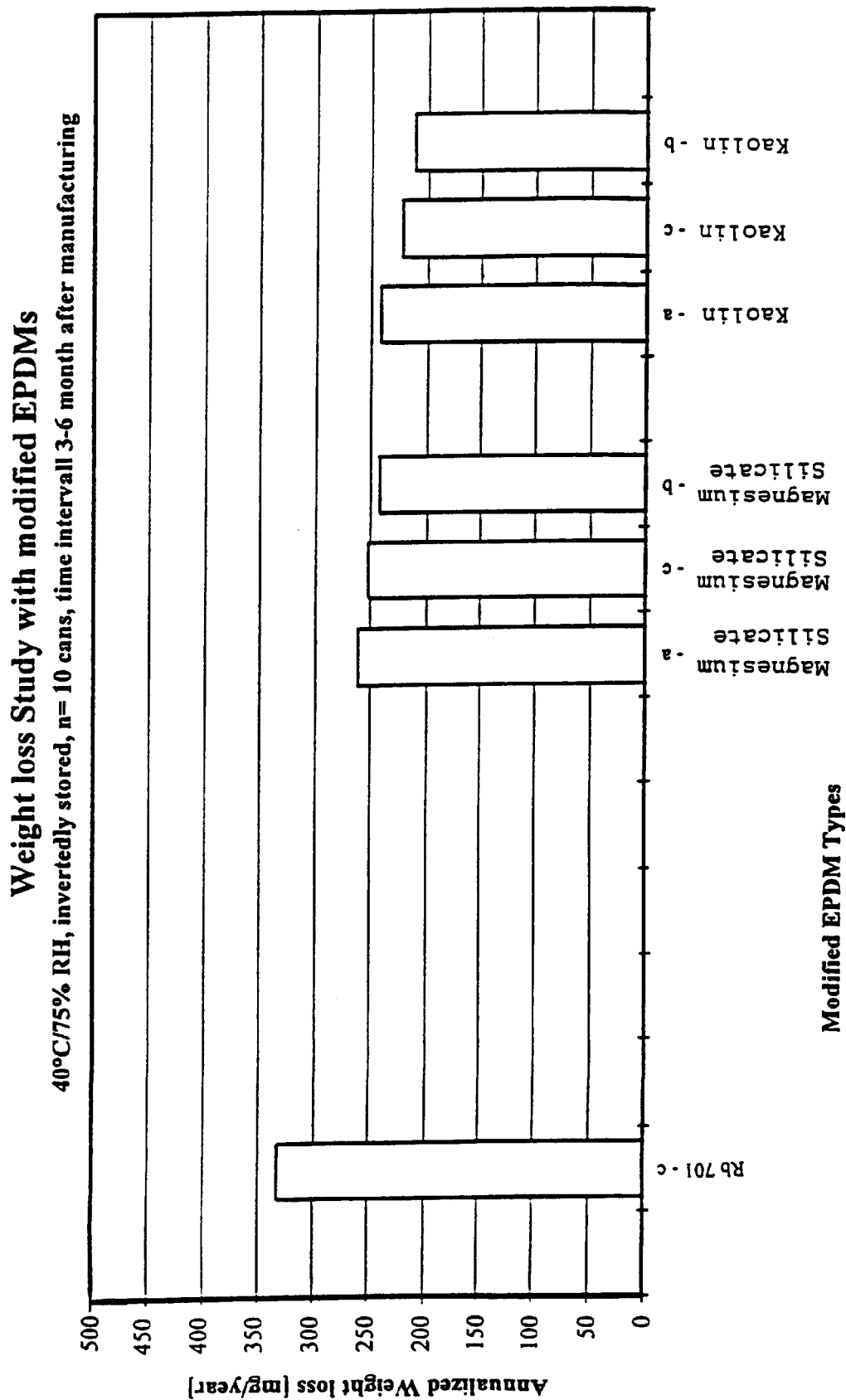

It has also been found that seals formed from a terpolymer of ethylene, propylene and a diene (EPDM) show substantially improved leakage characteristics using magnesium silicate or kaolin as a filler. This is illustrated with reference to FIGS. 1 and 2 which are graphs showing weight loss of test devices under two different temperature testing regimes AT 30° C. and 40° C. respectively.

In each case, the columns show weight loss from a dispensing device of the type described above in which the containers were filled with propellant 134A ethanol and an active compound. The first column in each case shows the weight loss using a current EPDM material sold under the commercial name RB701C and which contains Ultrasil filler. The remaining columns show weight loss of corresponding devices using magnesium silicate or kaolin as fillers. The respective fillers are indicated on the columns of the graphs.

In each case, the left hand axis shows annualised weight loss calculated from tests with groups of ten dispensing devices as time interval of 3 to 6 months after manufacturing and under different temperature regimes as indicated in the headings to the graphs.

These tests show that using magnesium silicate or koalin as a filler leads to a reduced weight loss under the test regimes thus indicating lower leakage from the devices. Similar results are obtained at ambient temperatures.

What is claimed is:

1. Dispensing apparatus for dispensing pressurized fluid comprising a valve body defining a chamber, a valve member extending movably through the chamber and through at least one annular seal disposed between the valve member and the body to regulate the discharge of fluid, characterized in that the or at least one of the seals is formed from a material comprising a terpolymer of ethylene, propylene and a diene, and the seal material comprises a mineral filler comprising magnesium silicate and/or kaolin.

2. Dispensing apparatus as claimed in claim 1, wherein the mineral filler further comprises silica.

3. Dispensing apparatus as claimed in claim 2, wherein the mineral filler comprises magnesium silicate, kaolin and silica.

4. Dispensing apparatus as claimed in claim 1 comprising a pressurized dispensing container operatively connected to the valve body and containing the fluid to be dispensed and a hydrofluorocarbon propellant comprising propellant type 134a or 227.

5. Dispensing apparatus as claimed in claim 4, wherein the fluid to be dispensed comprises a liquid or particulate product as a solution or suspension in a carrier liquid comprising alcohol.

6. Dispensing apparatus as claimed in claim 5, wherein the alcohol comprises ethanol.

7. Dispensing apparatus as claimed in claim 2 comprising a pressurized dispensing container operatively connected to the valve body and containing the fluid to be dispensed and a hydrofluorocarbon propellant comprising propellant type 134a or 227.

8. Dispensing apparatus as claimed in claim 7, wherein the fluid to be dispensed comprises a liquid or particulate product as a solution or suspension in a carrier liquid comprising alcohol.

9. Dispensing apparatus as claimed in claim 8, wherein the alcohol comprises ethanol.

10. Dispensing apparatus as claimed in claim 3 comprising a pressurized dispensing container operatively connected to the valve body and containing the fluid to be dispensed and a hydrofluorocarbon propellant comprising propellant type 134a or 227.

11. Dispensing apparatus as claimed in claim 10, wherein the fluid to be dispensed comprises a liquid or particulate product as a solution or suspension in a carrier liquid comprising alcohol.

12. Dispensing apparatus as claimed in claim 11, wherein the alcohol comprises ethanol.

* * * * *

UNITED STATES PATENT AND TRADEMARK OFFICE
CERTIFICATE OF CORRECTION

PATENT NO. : 6,234,362 B1  
DATED : May 22, 2001  
INVENTOR(S) : Thomas

Page 1 of 1

It is certified that error appears in the above-identified patent and that said Letters Patent is hereby corrected as shown below:

Title page,
Item [30], Foreign Application Priority Data, please change "June 27, 1996" to
-- June 27, 1995 --

Signed and Sealed this

Nineteenth Day of February, 2002

Attest:

Attesting Officer

JAMES E. ROGAN  
Director of the United States Patent and Trademark Office